United States Patent [19]

Frew et al.

[11] Patent Number: 5,143,787
[45] Date of Patent: * Sep. 1, 1992

[54] METHOD OF COATING A CARBON COATED MAGNETIC RECORDING MEDIUM SURFACE WITH A FLUOROPOLYMER LUBRICANT

[75] Inventors: Duncan W. Frew, Alamo; Robert P. Shadwick, San Jose, both of Calif.

[73] Assignee: Unisys Corp., Detroit, Mich.

[ * ] Notice: The portion of the term of this patent subsequent to Jan. 10, 2006 has been disclaimed.

[21] Appl. No.: 328,977

[22] Filed: Mar. 27, 1989

Related U.S. Application Data

[62] Division of Ser. No. 902,239, Aug. 28, 1986, abandoned.

[51] Int. Cl.⁵ .............................................. G11B 5/00
[52] U.S. Cl. .................................... 428/408; 428/421; 428/422; 428/694; 428/695; 428/900; 427/131; 204/192.15; 204/192.2
[58] Field of Search ............... 428/407, 408, 421, 422, 428/694, 695, 900; 427/131; 252/62.54; 360/134, 135, 136; 204/192.15, 192.2

[56] References Cited

U.S. PATENT DOCUMENTS 4,797,303  1/1989  Frew et al. ............................ 427/131

FOREIGN PATENT DOCUMENTS 60-223026  7/1985  Japan .

OTHER PUBLICATIONS

Caporiccio, Gerardo "A New Series of Lubricants for Magnetic Recording Media from Bifunctional Perfluoro Polyether Derivitive" Lecture at Symposium on Memory and Advanced Recording Technologies May 5-8 1986.

Primary Examiner—Paul J. Thibodeau
Assistant Examiner—Stevan A. Resan
Attorney, Agent, or Firm—John J. McCormack; Mark T. Starr

[57] ABSTRACT

Magnetic recording media wherein the record surface is coated with an isocyanate lubricant (and, preferably, a supercoat of like lubricant), such lubrication being adapted to inhibit spin-off and like depletion, despite frequent head-contact, while exhibiting good durability, wear resistance and recording characteristics over extended life (computer applications).

25 Claims, No Drawings

METHOD OF COATING A CARBON COATED MAGNETIC RECORDING MEDIUM SURFACE WITH A FLUOROPOLYMER LUBRICANT

This is a division of application Ser. No. 902,239 filed Aug. 28, 1986, now abandoned.

This invention relates to lubricants for magnetic recording compositions (e.g., as coated on a rigid data disc or like substrate), and more particularly to such including an improved surface lubricant system adapted therefor.

BACKGROUND, FEATURE OF INVENTION

Workers in the art of making and using magnetic recording apparatus for data processing and the like are well aware that the media therefor often present serious wear problems, such as may foreshorten their useful life. For instance, with rigid magnetic recording disc surfaces which support a thin-film magnetic recording head (carried on a "slider") passing at relatively high speeds, the head is all too apt to problematically abrade both itself and the medium.

A related problem is that of undesirably high friction between the disc and head (surfaces). To ameliorate abrasion, workers typically specify that a disc coating exhibit no more than a certain (maximum) coefficient of friction—this also reduces the force necessary to drive the disc past the head. To reduce friction and enhance wear, workers have resorted to various expedients such as "surface-(topical) lubricant" coatings on the disc's recording surface.

This invention is also concerned with such surface lubricants, and with techniques for affixing the lubricants to such record surfaces, preferably by chemical bonding.

Workers recognize the problems using such surface lubricants (on the surface of information carrying media such as magnetic recording discs and tapes). Such lubricants may be applied to a record surface, and held there, by purely mechanical means, for example, by capillary forces. Publications which illustrate physical retention of a lubricant on a solid surface include, for example, U.S. Pat. Nos. 4,188,434; 4,232,072 and 4,268,556. In these patents, no chemical bond is taught between the surface lubricant and the underlying surface.

According to the present invention, a prescribed isocyanate lubricant is applied to a record surface and cured there for a stable firmly-attached, chemically-bonded polymeric lubricant (contact disc with an isocyanate-terminated lube).

Generally "surface lubricants" as here understood are chemically inert and thus exhibit litle adherent interaction (such as hydrogen bonding or polar group interaction) with the record surface. Because of such loose adhesion when a record disc, as here understood, is rotated at high speed, the lubricant tends to migrate from the disc (e.g., adhesion forces being gradually overcome by the centrifugal force), and thus the lubricants are spun-off and depleted, with consequent likelihood of "head crash".

According to the present invention, such lube depletion is inhibited by application of a thin film of isocyanate lubricant to the information carrying surface, this film being so chemically-bonded to the surface as to not be readily removed (e.g., by washing or rubbing with isopropanol). Record surfaces apt for this include, for example, magnetic discs, magnetic tapes, sound recording media and the like, especially certain compatible polymeric surfaces and metal surfaces.

Such lubricant coatings are particularly apt for polymeric magnetic record disc surfaces (e.g., of the type used in computer recording), especially where the relative head-medium velocity is very high, and the head is highly abrasive (cf. thin film heads) and consequent abrasion and reduced life of both head and media is quite likely. Thus, workers have restorted to various known "surface-lubricant" means for such disc coatings and like media (e.g., see the following U.S. patents: U.S. Pat. Nos. 3,490,946; 3,492,235; 3,523,086; 4,431,702; 3,983,302; 3,837,912; 3,597,273; 4,446,193; also IBM TDB Vol. 26, #7B, p. 3778, December 1983; also article by Budinski in J. Vac. Sci. Technol. Vol. 12, #4, July-August 1975, pp. 786+; and article by Hamada, et al., J. Appl. Phys. 55(6), Mar. 15, 1984, pp. 3775+.

Depletion of surface lubricant on a spinning magnetic recording disc is believed primarily due to "spin-off" initiated by centrifugal forces. Some subsurface lubricant (within the body of the magnetic coating itself) is at times suggested as a potential reservoir for replenishing the surface lubricant so spun-off.

Workers are aware of the "spin-off" problem and recognize that it commonly depletes surface lubricant prematurely inducing head-crash and system failure. A salient purpose of this disclosure is to inhibit such depletion by application and chemical bonding of an isocyanate-terminated (or acid-terminated) lubricant to a polymeric record surface, especially where the polymeric surface exhibits free, reactive groups (or can be induced to do so)—e.g., hydroxy—which can chemically bond with the reactive isocyanate (or acid) groups, to yield urethane or ester bonds. Similarly for metal surfaces.

A related object is to match this isocyanate lube with the characteristics of a lubricant supercoat thereon (e.g., significant mututal solubility and mutual molecular attraction plus substantial inter-diffusion) for improved adhesion thereof and synergistic co-lubrication. Thus, the two lube layers of like composition and structure can, together, act to inhibit depletion of the top lubricant layer.

It is an object of this invention to address such problems and particularly to teach novel magnetic recording compositions including improved surface lubricant systems, especially for systems with rigid disc media and thin film heads.

For instance, compared with a standard ferric oxide computer disc coating in a certain polymeric binder, a novel lube reactive coating system according to our invention applied as a scant undercoat for normal surface lube will reduce spin-off and like depletion, and enhance durability and operating life—to the surprise of workers! (e.g., because our undercoat material is conventionally viewed as a lubricant—thus we are improving adhesion of a lube coat by a lube under-coat!). Such a reactive lube undercoat may include isocyanate-terminations. They also, preferably, include fluorocarbon moieties (preferably fluoro-alkyls such as fluoro-ether polymers); further they are preferably super-coated with a fluorocarbon lube system of similar structure. For instance, a preferred reactive coating comprises a diisocyanate-terminated perfluoro-poly-ether which is very apt for use with a super-coat lube including fluoro-ether constituents (less preferably, the fluoro-version may be substituted for the perfluoro-poly-ether but will typically be less stable; for instance, where hydrogen replaces fluorine, it will be more likely to react adversely, change properties, offer a point of corrosive attack, etc.).

Now workers have, of course, suggested fluorocarbon surface lubricants for magnetic recording surfaces. But such lubricants, in themselves and in general, are not necessarily effective in affording the kind of superior durability, stability and spin-off resistance we desire; also, in heavy concentrations they can badly impair magnetic performance (e.g., see U.S. Pat. No. 4,431,703).

Some workers have suggested various organic (e.g., organo-fluorine) compounds as lubricants for rigid magnetic recording media (e.g., see U.S. Pat. Nos. 3,993,846, or 4,007,314, or 4,131,717—or see U.S. Pat. No. 4,007,313 mentioning an organo-silicone-fluoride lubricant).

The tendency now is to increase density of recording using very thin magnetic media films having highly polished surfaces and using recording heads which fly practically in contact with (often actually sliding-over) these films. This calls for substantial improvements in surface lubrication for such high-density magnetic media, with lubricant layer specifications becoming very stringent. Such a lubricating layer should be as thin as possible (order of magnitude of several dozen A° or more) and yet be very stable, long-lasting, effective and durable; it must not react with the record-binder lest it plasticize the record surface and, over all, it must not be removed or significantly depleted in use.

Common "migratory" lubricants (which are added to the bulk of the record coating) are now suspect under such circumstances; e.g., their migration rate cannot be controlled with sufficient precision; hence they cannot assure a surface lube-coat which is sufficiently uniform.

"Topic" or surface-applied lubricants (e.g., fluorocarbon oils) are now coming into favor for such media—indeed, in some cases, such as with thin film metallic media, workers feel there is no other conventional way to achieve superior surface lubrication.

As a feature hereof, such media are surface-coated with a scant, well-bonded film: i.e., the (urethane) reaction product of the isocyanate-terminated polymer lubricant and the surface hydroxyls—(or the analogous ester product of the acid-terminated polymer).

Fluorocarbon liquid films are generally known as useful to lubricate magnetic recording media (e.g., rigid discs of the Winchester type; cf. pp. 1073+ of IEEE Transactions on Magnetics, Vol. MAG-18, No. 6, November 1982). Such lubricants have desirable properties (oxidative and thermal stability, chemical inertness, wettability, viscosity range, etc.), but the mass of lubricant on the disc must be carefully controlled. If there is too little, head-wear is excessive and "crashes" can occur. If too much lubricant is applied, puddling and "stiction" of the head can occur; e.g., during "start-up". This can result in distortion of a head flexure and disc damage (and so can lead to a latent failure situation; cf. all the factors which cause "stiction" are not known, but excess lubricant seems to be a major contributing factor).

GENERAL ASPECTS OF EMBODIMENTS

Certain salient features of our developments will come to mind upon review of this specification.

For instance, we prefer to formulate our lubricant system to comprise an initial layer of isocyanate-terminated (and/or acid-terminated) polymer lubricant. Our lube systems are particularly apt as a surface-lube film for "in-contact" media (i.e., media characterized by continual, or periodic, frequent contact of a thin film head therewith—as distinguished from media which are seldom, if ever, so contacted; e.g., when the head usually "over-flys").

Such an "isocyanate-lube film" (or acid-terminated film) may be understood as a "reactive lubricant"; i.e., one with end-molecules that firmly attach themselves to the record surface (cf. polymeric recording surface of a magnetic record disc). To break such a bond and cause spin-off and depletion of the lube, energies of 128 to 184 k. cal/per molecule are seen as required. This is far greater than the mechanical forces developed on any spinning disc record.

A "reactive lube" should have a characteristic "bonding molecular structure"; i.e., a carbon chain exhibiting lubricant properties, with one or several apt "reactive" terminal groups which are capable of further reaction.

A preferred substrate record surface for our reactive lube film will be characterized by discrete surface molecules exhibiting, or capable of generating, reactive groups (especially hydroxyls) apt for reacting with acid or isocyanate terminations to form a "strong bond". Curing reactions which take place may also produce additional functional groups. For example, epoxy and/or phenolic binder resins used in recording embodiment coatings herein evidently contain such hydroxyl groups, or can readily be made to do so—as can most magnetic record binders.

Typical structures for such an epoxy (Epon 1004) and phenolic (Methylon 75108) are shown below (an E-P type binder):

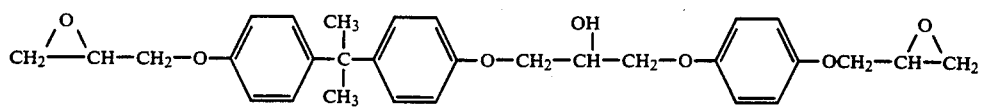

"Epon 1004" (epoxy)

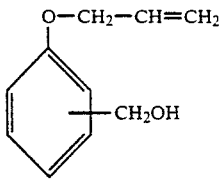

n = 1-3
"Methylon 75108" (phenolic)

In addition, the curing reaction for such binders can produce useful ester or ethers, depending upon the resin and the relative rates of the various reactions. A related uncatalyzed reaction is shown in simplified form as:

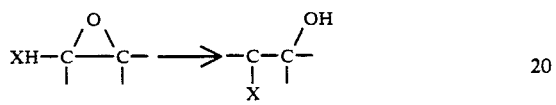

Whereas a catalyzed reaction can yield an ether; as:

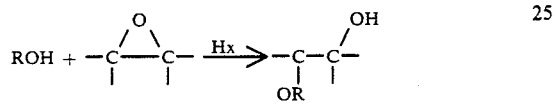

Thus, the unreacted binder resins produce such functional hydroxyl groups, as well as resins which are partially reacted or fully reacted (cross-linked). We have seen evidence of such hydroxyl groups, of such ester groups and of the disappearance of epoxy groups in instances like some embodiments herein.

A salient feature hereof is that the reaction of hydroxyl groups on the disc record-surface with isocyanate of our lube surface-coat yields a urethane bond at the surface of the disc, firmly adhering the isocyanate-lube on the magnetic recording coating.

A particular preferred isocyanate which forms the basis of such a "reactive lube" according to this invention is produced from a "diol" (e.g., a fluoro-poly-ether-diol) and a di-isocyanate; to combine, and produce a short-chain fluoro-alkyl polymer that is di-isocyanate terminated, i.e., a "Disoc" as here understood.

Workers will see that magnetic, in-contact digital recording surfaces may be enhanced and made more practical commercially (reasonably low depletion, high durability/life) by a mere coating with our novel "reactive-Disoc-lubricant" (or a related acid-terminated analog)—as the following Examples will show in some detail.

One preferred embodiment involves the application and reaction of a fluorocarbon diisocyanate "reactive lube" with functional terminal hydroxyl groups on the magnetic recording surface to form a cross-linked surface layer with urethane bonding of the lube to the surface. The diisocyanate is preferably based on a fluorocarbon lube and materials which are available commercially; and can be readily prepared from available materials.

The "reactive-lube" system and process described in this embodiment involves, in preferred forms:

a) readily obtainable materials;
b) specifically a diisocyanate-terminated and/or acid-terminated lube, particularly a fluorocarbon giving a stable "reactive-lube-undercoat" layer on record-surface, especially where this "under-coat" exhibits cross-linked fluorocarbon;
c) reaction with functional (especially hydroxyl) groups on the disc surface, to be firmly bonded thereon; especially via urethane bonding and/or ester bonding between the record surface and the undercoat (readily induced; e.g., by heating an hour or so at about 100° C.);
d) controlled lube film thickness;
e) an additional super-posed surface-lubricant layer applied which is mutually soluble in the "reactive undercoat", and so is better retained thereon;
f) good wear characteristics;
g) little or no appreciable depletion rate (spin-off); and
h) easily applied; and with
i) super-coat of surface-lubricant retained on undercoat via mutual solubility, etc.

While a number of chemical reactions can be used to bond such reactive layer lubricant molecules to a (disc) record surface, we believe our "reactive isocyanate" mode is best, considering material availability, reaction rate, stability of the reacted layer, and effectiveness. Other methods of attachment, such as esterfication, etherfication, etc. will prove more difficult to carry out and give products which are less stable.

Our polymeric isocyanate lubricants may be synthesized from the corresponding materials as workers recognize. Preferred starting materials include fluorinated polymer lubricants such as poly(perfluoropropylene oxide) di-carboxylic acid, and poly(perfluoroethylene oxide) di-carboxylic acid.

In a preferred form of the present invention, the mentioned layer of like-structure surface-lubricant is superposed atop the "reactive lube" under-layer, preferably retained there by inter-molecular attraction, by good inter-solubility and/or by inter-diffusion between the two layers (which thus have basically similar structures and, preferably, an identical "backbone". Spin-off and like depletion is thus inhibited, if not essentially eliminated.

The invention will be better appreciated by workers upon consideration of the following detailed description of some preferred embodiments.

DESCRIPTION OF PREFERRED EMBODIMENTS

General Description, Background

Example I illustrates a magnetic (disc) recording substrate coated with a recording composition, and then a lube system formulated and applied according to principles of this invention.

This, and other means discussed herein, will generally be understood as selected, formulated, and operating as presently known in the art, except where otherwise specified. And, except as otherwise specified, all materials, methods, and devices and apparatus herein will be understood as implemented by known expedients according to present good practice.

A relatively conventional magnetic record polymeric coating will be understood as disposed on a rigid computer disc according to the invention, and modified to include a novel isocyanate-terminated lubricant layer.

Following is a specific Example of such an isocyanate lube system embodiment used in the practice of the present invention. This composition is prepared to include the mentioned components in indicated concentrations, and to be applied, processed and used as indicated.

EXAMPLE I

A magnetic disc record of the type coated with a polymeric magnetic recording film (magnetic oxide in polymeric epoxy-phenolic type binder (see E-P above) for Write/Read in-contact with slider) is presented for surface lubricant treatment according to the invention. The record surface is assumed to have been finally treated (e.g., polished, burnished, degreased and otherwise fully cleaned), except for surface lubrication and related steps.

A fluorocarbon polymeric "reactive lubricant" exhibiting isocyanate end groups is prepared (cf. "Disoc" as above; e.g., molecular weight about 2000) and is applied sparingly to the recording surface of the disc to give a scant, uniform, relatively continuous, minimum-thickness surface coating. After sufficient time, at operating temperature (e.g., can be heated to accelerate cure), to assure appropriate degree of cure (surface-bonding of binder hydroxyl, with reactive isocyanate end-groups and urethane-bond the record surface material), a "strip" step may be executed, removing unwanted, uncured material and further assuring a scant, uniform residue film left on the record surface. Alternatively and preferably in many cases, this "strip" is replaced by a "quench" whereby unreacted isocyanate terminations are inhibited from later reacting (e.g., by contact with an azeotropic mixture of Freon TF and alcohol).

Preferably, the polymeric binder presents free, reactive (cf. OH—) groups apt for chemical bonding with the lube's isocyanate end-groups. Such reactive hydroxyl can be developed, as workers know, in many common binder polymer moieties, such as on the phenolic and the epoxy portions (e.g., cf. opening of epoxide ring).

The reactive isocyanate groups are very reactive here; and may pick up unwanted contaminants like moisture—thus an inert atmosphere (e.g., $N_2$ blanket) may be in order, e.g., until curing finished.

The record may now be used, or, if one wishes to further assure optional surface lubrication, a compatible super-lubricant film may also be applied (e.g., preferably a like fluorocarbon lubricant).

Workers will note that the scant isocyanate-lube reactive film (prefer 40-90 A°) seems to yield good lubricating characteristics of itself, and especially when supplemented with a like lubricant super-coated on the film. Spin-off and other lube depletion seems markedly inhibited.

We assume (though it is not certain) that the record surface has essentially been modified by this isocyanate film, from the original relatively hydrophobic, highly polar surface to a "lower-energy" surface (e.g., more compatible with a lube super-coat). Evidence of this is the fact that relatively little spin-off occurs. Such a coated record appears to exhibit superior lubricant characteristics over extended use; e.g., easily passing standard CSS (Contact Start-Stop) tests; e.g., 10-20 k. CSS.

Of course, for increased toughness, load-bearing and durability, the isocyanate-lube will be prepared to exhibit moderate-to-high molecular weight (e.g., at least several thousand). Also, excess thickness will be avoided lest too much unreacted (unbonded) lube material remain and "soften" the lube film.

EXAMPLE II

A record disc is lube coated as in Example I, with the isocyanate-lubricant comprising a pair of isocyanate end groups on a relatively short, low molecular weight fluoro-alkyl chain, being sponged on the recording surface uniformly in a Freon diluent (up to a few wt. % therein), and buffed or otherwise worked to spread more uniformly. Like results are obtained.

EXAMPLE III

Example II is replicated with a di-isocyanate formed on a fluoro-ether polymer backbone. Like results are obtained.

EXAMPLE IV

Example I is repeated, using a higher molecular weight isocyanate-terminated lube (e.g., 3-4000 or more) for the "reactive film" and no super-lubricant added on the reactive film—which will thus serve as the sole "surface-lubricant". This may be satisfactory for "light" service (e.g., only a few k. -CSS, or with a ferrite head, rather than a thin film head).

EXAMPLE V

Example III is replicated, with a second layer ("top-layer") of surface lubricant superposed atop the di-isocyanate-terminated fluoro-ether reactive film. This "top layer" is of suitable thickness and similar structure to reactive film (e.g., fluoro-ether lube also). It will be seen as retained in place better than conventionally (i.e., better than where no such "reactive film")—evidently because of the inter-molecular attraction, etc., between like layers, and because the underlying "reactive film" is so firmly bonded to the record surface.

EXAMPLE VI

Example III is replicated, with the di-isocyanate-lube polymer prepared from a poly(perfluoro alkylene oxide) compound. Acceptable methods and materials for preparing such are known in the art; for example, some are disclosed in U.S. Pat. No. 3,810,874 and in U.S. Pat. No. 4,085,137, both incorporated herein.

The so-developed isocyanate-terminated "reactive lube" is coated as in Example I-III, etc., on the recording surface and reacted there, then excess unreacted material stripped away. The isocyanate end-groups should eventually form urethane bonds with the free hydroxyl moieties in the (epoxy-phenolic) binder on the record surface. These chemical bonds are very strong and will resist all conceivable spin-off forces. The scant (e.g., several dozen A°) isocyanate film left is then coated with a "surface-lubricant" readily soluble in the (isocyanate) reacted film. Preferably this surface-lube is a relatively high m.w. perfluor poly ether (Z-60, Z-25, polyethylene oxide by Montedison, etc.); and will be mutually soluble, etc., in the reacted film (isocyanate) and so be better retained thereon and resist spin-off and like depletion.

Results are satisfactory as above.

EXAMPLE VII

Example VI is replicated, with a "Disoc" type perfluoro-polyether, isocyanate-terminated "reactive lube" film as described above, with the record surface including epoxy and phenolic binder polymers (e.g., as "EP Binder" described above).

The "Disoc" is applied and heat-cured until about 80–95% reacted (e.g., about 100°–110° C. for about 90 min.) to yield urethane bonding—with excess unreacted unbonded Discoc then removed to yield a scant isocyanate-film of about 40–90 A° (pref. 50–70 A°) or, in any event, whatever it takes to form just one or several continuous, mono-molecular layers, if at all possible ("ideal thickness").

The results are satisfactory as before, with relatively little lube spin-off, no "stiction" or "head corrosion" problems and with good operational durability (e.g., passes 10–20 k.+ Contact Start/Stop cycles). No toxicity or environmental problems will be seen [e.g., surprisingly, no water-uptake problems will be seen, and the so-lubed disc will give extended service even in high heat-humidity conditions].

EXAMPLE VIII

Example I is replicated, except that the reactive-film (fluorocarbon) lubricant is modified to include acid terminations appropriate for ester-bonding with the record surface (e.g., with reactive OH groups found, or induced therein—as can be done with virtually any current record binder). These acid terminations may be substituted for the isocyanate terminations, or supplemented thereto.

EXAMPLE IX

Example VII is replicated, with the reactive film "Disoc" lube (isocyanate-terminated perfluoro poly ether) prepared as follows:

1) A suitable form of carboxylic acid is mixed with a suitable di-isocyanate in a solvent therefor—preferably α,ω terminated carboxylic acid in Freon TF (cf. about 50 ml. Freon tri-cloro, tri-fluoro ethane) mixed with (an aliquot) 2, 4 toluene di-isocyanate.
2) The mixture is stirred for about one hour; then the solvent evaporated, leaving a "Disoc" product: i.e., α,ω di-isocyanate of a perfluoro poly ethylene oxide polymer.
    [as workers recognize, a -polypropylene oxide Disoc analog may likewise be prepared and substituted here]
3) The "Disoc" is applied to the medium surface (e.g., diluted in suitable solvent, and cured, so a suitable number of urethane bonds form with the surface —OH groups.
    more particularly, this "Disoc" may be dissolved in Freon TF (0.5–2 wt. % strength) and applied via sponge applicator, or any like means, yielding as uniform a thickness as possible [e.g., initially 5–20 mg., corresponding to thickness of about 150–600 A°]
    Alternatively, one may wipe-on, spin-on, spray-on or the like; and the Disoc may be otherwise diluted, or applied full strength.

It is usually necessary to buff, or similarly "work" the rather viscous Disoc, to spread it more evenly across the record surface.

curing (decomposition to effect urethane bonding) may be done by any convenient practical method that yields the appropriate degree of urethane bonding with reasonable time and expense. We have found that heating (oven) for about 1.5 hours at about 100°–120° C. is satisfactory (e.g., 90–95% bonding by available isocyanate).

since the isocyanate is so active, it may be advisable to screen-out unwanted reactants (e.g., moisture) with an inert atmosphere (e.g., $N_2$ blanket) until the cure-period is concluded.

4) Unreacted material (unbonded isocyanate, etc.) is preferably removed (e.g., washed off with Freon TF or like solvent).

The remaining "reacted-lube" film (pref. 40–90 A° thick, and uniform, continuous across record surface) will be found to be firmly bonded to the record surface (urethane bonds).

The results are, otherwise, as before.

Now, workers are aware of the concept of applying certain lubricants containing highly polar groups on recording media (e.g., see U.S. Pat. No. 4,268,556) and of bonding a lubricant on a record surface by generating a highly reactive carbene which reacts with the surface in some manner (e.g., see U.S. Pat. No. 4,446,193 or U.S. Pat. No. 4,120,995). A related bonding of a telechelic polyether is suggested in U.S. Pat. No. 4,268,556 (evidently depending upon loose molecular associations called "van der Waals forces", rather than discrete chemical bonds, though thermal stability and "spin-off" would be inferior to a more firmly chemically bonded system, and lubricity would probably be inferior too).

U.S. Pat. No. 4,446,193 describes a chemically-reacted lube system. It involves a rather problematic synthesis of a diazoketone, and subsequent decomposition thereof to a carbene. The synthesis of the diazoketone is complicated; also purification of the product is a problem. In order to form the carbene internmediate, temperatures of ca., 200° C. must be used; alternatively, U.V. exposure can be used, though U.V. absorption by a thin layer of diazoketone would likely be minor and thus inefficient. While the carbene can react with a record suface, it is difficult to determine the course of the reaction. The carbene can, in fact, react with itself, which would reduce its effectiveness.

The '193 also states that carbenes can react with metal oxides but no specifics are given. If, in fact, the reaction with metal oxides produces a useful species is unknown.

U.S. Pat. No. 4,120,995 teaches (chemically) bonding a lubricant to a substrate; as does European Patent No. 123707 (Nov. 7, 1984). The '707 patent appears to use a fluorocarbon undercoat with silicon-bonding to the substrate (a bonding expedient somewhat different and less efficient than urethane bonding; also less stable; for instance, the silicon bonds are unfortunately all too subject to rupture (e.g., by hydrolysis); also HCl is left on the medium as a by-product, presenting a serious risk of corrosion. European '707 also seems to suggest the possibility of using a surface-lube overcoating but employs fluorocarbon end-groups to retain this on a protective-film (analogous to our "undercoat"), seemingly a weaker, less stable retention mechanism.

To recapitulate, our Examples describe an isocyanate-terminated (or acid-terminated) "reactive lube undercoat" to inhibit lube depletion (e.g., spin-off of a lube super-coat). This is done by applying and chemically-bonding such an undercoat on virtually any conventional polymeric magnetic recording surface susceptible of exhibiting appropriate functional groups to react with the isocyanate (or acid-) and produce strong bonding (e.g., this is true for essentially all polymer binders used with disc media of the type used to record high density digital data for high-speed data processing), with spin-off reduced. As described, this very thin undercoat should be well cured on the recording surface (with most uncured material removed).

Subsequent application thereon of a relatively conventional like-structure, like-solubility surface-lube system (e.g., a fluoro-alkyl as described) is also very effective, yielding a novel, surprising "lube-on-lube" two-layer coating which is highly stable and resistant to spin-off depletion, and thus is superior for such high speed computer operation with a conventional TF head-"slider", etc.

The isocyanate (or acid)-terminated "reactive lube" films of this invention will be seen to increase lubricant retention on magnetic disc coatings to give better wear characteristics and longer and more reliable product life.

Application to Metal Surface

The foregoing explains how our isocynate-terminated (or acid-terminated) reactive lube (cf. "R-Lube") may be advantageously applied to a polymeric surface. We have also found—to our surprise—that such an "R-Lube" can also be used on a metal surface. Such is described as follows:

EXAMPLE AA

On Co-Ni; On Cr

We wondered if such an "R-Lube" could be advantageously used on a disc with a sputtered metal film surface. Thus, a disc with a sputtered Co-Ni film, non-overcoated, was found. On this, a 1% by wt. "disoc" solution of the type in EXI (isocyanate terminations) was applied by hand. The same was done with a like disc having sputtered Cr thereon (no overcoat in either case).

The discs were cured for 90 mins at 100° C., then stripped in Freon TF, (degreased with Freon TF, if desired) and measured by ellipsometry to determine disoc thickness, this giving:

| Disc: | |
|---|---|
| #1 (Co/Ni) | #2 (Cr) |
| Side A 282 A° | Side A 123 A° |
| Side B 264 A° | Side B 125 A° |

It was rather surprising that any (appreciable) thickness adhered to either metal surface (e.g., more than a mono-layer or two, i.e., 40–80 A°); but especially surprising that such a thick, continuous coat adhered so well! (Note: the Freon wash is a harsh test of adhesion, typically removing all lube). In turn, it appeared that some part of the R-lube likely reacted with reactive material present on the metal surfaces (possibly —NCO of R-lube with —OH on metal)—but this too was unexpected (e.g., to find sufficient reactive —OH present to give this kind of adhesion).

The ellipsometer values were checked with ESCA using the argon etch method, comparing the before and after Co (3p) signal while monitoring the carbon and fluorine (1s) signals. The value determined was 150°±20 A° for the cobalt-nickel disc (may be low because of the thickness of the layer; ESCA usually works better with thinner layers). Nevertheless, a relatively thick layer of disoc is unquestionably present, and quite adherent (e.g., not removed by Freon TF, a harsh test!).

EXAMPLE AB

With Carbon Overcoat

A similar test was performed with two carbon-overcoated discs. The initial ellipsometer readings showed a much larger variation than with the above uncoated sputtered films. This could be the result of the non-uniformity of the coating or surface roughness.

This might explain the large difference in the disoc thickness of the two discs.

| Carbon Overcoated Disc: | |
|---|---|
| #1 | #2 |
| Side A 51 A° | Side A 142 A° |
| Side B 67 A° | Side B 142 A° |

It was not clear why the disoc should react with the carbon surface. One would not expect hydroxyl groups on the surface, though such may have resulted from adventitious oxidation or absorption of water vapor.

It was quite surprising—indeed astonishing—that so much R-lube adhered (so well, so thick) to the carbon-overcoated metal (e.g., while carbon itself is known as an "absorber", there was no reason to assume that R-lube would be firmly adherent—even in the face of the Freon wash).

One might ask how stable is such a disoc layer. The two metal film discs of Example AA were allowed to stand over the weekend, then degreased and remeasured. No change in disoc thickness was observed.

This disoc film on non-overcoated or overcoated metal discs is relatively thick compared with that on polymeric oxide media. Thus, it occurred that the mechanism of surface reactivity may be sufficiently different that one could adhere additional layers of disoc (i.e., added on to the layer achieved above). This was attempted (same conditions as before).

The results, shown below, indicate that only the carbon overcoat will accept additional disoc.

| | Non-Overcoated Disc: | | | |
|---|---|---|---|---|
| | #1 (Co/Ni) | | #2 (Cr) | |
| | Side A | B | Side A | B |
| 1st layer | 282 A° | 265 A° | 123 A° | 125 A° |
| 2nd layer | 291 A° | 247 A° | 118 A° | 121 A° |

| | Carbon Overcoated Disc: | | | |
|---|---|---|---|---|
| | #3 | | #4 | |
| | Side A | B | Side A | B |
| 1st layer | 51 A° | 67 A° | 142 A° | 142 A° |
| 2nd layer | 334 A° | 298 A° | 450 A° | 454 A° |

One aspect of this test is to see if the R-lube will "react with itself"; i.e., a second layer react with the initial layer. The "non-overcoated data" above indicates that no such build-up takes place on a bare non-overcoated metal disc—yet accretion occurred on the carbon-overcoated discs. These not only accepted a second R-lube thickness (reacted, adherently) but did so with amazing alacrity, multiplying the original R-lube thickness by up to $6\times-7\times$!—a most surprising outcome; all the more surprising since no "self-reaction" is occurring (as the "non-overcoated" data seems to establish)!

All of the data are an average of 3 points on the disc. The second layer of disoc showed a wide variation on the Co/Ni disc which is difficult to explain. (Hand application is not the best experimental technique). At any rate, the coatings on the chromium disc were quite uniform.

By contrast, the carbon-overcoated discs accepted a second layer which was astonishingly thick; this might be explained by "porosity" (cf. the disoc film must be on the order of 10 monolayers thick).

EXAMPLE AC

Repeat Example AA, with Co-Ni, Aged 2 Mo.

It was decided to repeat the test with discs of known composition and age (without the overcoating, since this would be the preferred configuration). The same conditions were used as before and the data is shown below. (Measured ID to OD, across one side of each of 3 discs; each with sputtered 80 Co-20 Ni, aged about 2 months):

|    | Disc: | | |
|----|-------|-------|-------|
|    | #1    | #2    | #3    |
| ID | 145 A° | 155 A° | 86 A° |
| —  | 152 A° | 180 A° | 53 A° |
| —  | 140 A° | 157 A° | 74 A° |
| OD | 199 A° | 203 A° | 122 A° |

This test corroborates previous data for bare uncoated metal surfaces that were produced and aged in a known manner.

[Note: One might attribute the lower thickness of disoc on disc #3 to the hand application method, but we think the surface chemistry is responsible in spite of the fact that the initial (bare disc) ellipsometer readings were almost identical among the three discs].

EXAMPLE AD

Freshly-Sputtered Metal

Another attempt was made to check the uniformity of the disoc application using discs which were "freshly-sputtered" (less than 24 hours old). After processing the discs in the same manner as before, the values for disoc thickness, shown below, indicate that very little disoc remained on any disc (essentially ZERO, i.e., "contaminant level").

| Across One Side | Disc | | | | |
|---|---|---|---|---|---|
|   | A | B | C | D | E |
| ID | 24 A° | 1.5 A° | 21 A° | 15 A° | 2.5 A° |
| —  | 5 A°  | −3.8 A° | −1.5 A° | 15 A° | 0.5 A° |
| OD | 3.8 A° | −4.8 A° | −2.3 A° | 5 A° | −2.5 A° |
| Avg | 11 A° | −2.0 A° | 6 A° | 12 A° | 0.2 A° |

(Minus A° means below level of "control-plane"; equates to "zero" thickness essentially).

Here, our equipment was not really able to accurately measure such low film thicknesses. The data does indicate that some disoc was present, though very non-uniformly distributed. The optical quality of the disc (surface roughness) was not good enough to accurately measure such very small thickness values.

EXAMPLE AE

As AD, but Aged Two Months:

The discs of Example AD were stored in a closed (non-air-tight) container for nearly two months; then the same test was performed again. Surprisingly, there was no difference in the initial ellipsometer readings over a period of two months. However, very thin (1–5 A°) layers would remain undetected (couldn't pick up ±5 A° change anyway).

After applying the disoc in the same way as before, and degreasing twice, the following thickness measurements were found.

|     | Disc: | | |
|-----|-------|-------|-------|
|     | E     | D     | C     |
| ID  | 216 A° | 190 A° | 320 A° |
| —   | 132 A° | 113 A° | 200 A° |
| OD  | 99 A°  | 86 A°  | 200 A° |
| Ave.| 149    | 123    | 240    |

This group shows the same variability as the previous discs. This might be due to high friction during hand application; or else whatever surface reaction is taking place (to allow the disoc to bond to the surface) may not be uniform across the disc surface.

Nevertheless, it is evident that the surface of the disc is changing with time, and it is this process that allows the disoc to react with the surface.

The initial ellipsometer readings exhibited very little change with time, leading one to conclude that, whatever the mechanism is, it must involve extremely thin surface layers.

CONCLUSIONS

Thus, we believe it possible, with this invention, to lubricate (sputtered or plated) metal recording disc surfaces whereby a continuous, controlled source of lubricant is present on the disc surface, if the surface is properly treated (e.g., "aged", etc.). Such films are produced by combining two lubricant layers, one of which—the "R-Lube" (as before)—is permanently bonded (chemically) to the disc surface; a second surface-lube film can be applied over the R-lube, and will adhere, despite spinning (centrifugal) forces by virtue of very strong physical (e.g., London Dispersion) forces existing between the R-lube and surface lube layers. To achieve (optimize) this adhesion, one must suitably match the chemical and physical properties of the surface lube to those of the R-lube.

EXAMPLE X

Preferred R-Lube on Bare Metal; Pre-Bake:

Hence, we prescribe a modified fluorinated polymeric "R-Lube" for metal substrates (R-Lube$_m$) as follows:

"R-Lube$_m$: $X-CF_2-(C_2F_4)_m-(CF_2O)_n-CF_2-Y$

[where X and Y are chemically reactive groups attached to a poly (perfluoroethylene oxide) or (perfluoropropylene oxide) chain molecule] is chemically bonded to the surface of the metal disc.

Or, one might view the "R-lube" as:

X—RR—Y where X, Y, as above (di-terminations pref.): RR a fluourinated polymer "backbone", which, preferably, is chosen to replicate the ("backbone" of the) contemplated surface-lube (S-lube); thus, once the R-lube terminations have reacted, the R-lube will be, for adherence purposes, remarkably similar to the S-lube (same "backbone", preferably—e.g. most prefer -ethylene in both cases; less preferably -propylene). The S-lube preferably will exhibit no (problematic) reactive groups.

We prefer that the R-lube chain (can be branched or linear) be relatively short to enhance the density of reactive sites (e.g., about 3,000 m.w., prefer less than about 10,000).

The chemical bonding (e.g. —NCO to —OH) is preferably facilitated by a "cure-heating" (e.g. here, 40-80 minutes at about 100° C. is good). The R-lube thickness is preferably about 40-100 A° (prefer 60-70 A°), with the S-lube about the same or somewhat greater (e.g. up to about 2×). The so-reacted R-lube evidently takes on solid lube properties.

The similarity of the S-lube to the R-lube will, evidently, induce mutual inter-solubility, high "cohesive-energy density" and like strong adhesion forces (cf. "London Dispersion" forces).

The X and Y moeities are preferably isocyanate, less preferably epoxy or acid, or a like reaction-product or similar group that reacts with —OH.

The reaction takes place with metal —OH groups on the metal surface and results in bonds permanently attaching the fluorocarbon lubricant to the metal surface. To facilitate a good reaction and bonding, one must pre-treat the metal surface, preferably by heating in air (and air-cooling)—probably to enhance the density of reactive hydroxyls.

It is preferred to use a properly "aged" disc surface; or more preferably to pre-heat sufficient to assure good reactivity (cf. OH with —NCO).

Thus, a sputtered disc (e.g., Co-Ni) is preferably pre-baked in-air (oven) at about 100° C. for about 2 hours or more; then cooled in-air. We theorize (though it is not certain) that this helps by enhancing reactivity (cf. density of —OH on surface). Other alternative pre-treatments are feasible (e.g, other mode of oxidizing; alternatively enhancing presence of aqueous residue on surface).

Obversely, one should not apply R-lube to a fresh unaged, untreated metal surface (e.g., freshly sputtered Co-Ni—aging in warm air at the least).

Excess unreacted fluorocarbon material is removed from the disc surface by post treatment (e.g., stripped with a suitable (freon) solvent). Such lubricant films may be applied by hand or machine, and film thicknesses up to about 250 A° can be obtained. A preferred film thickness is a mono-layer, or somewhat more (e.g., 40°-100 A°).

To complete the lubrication scheme, the "R-lube$_m$" "reactive lubricant" is coated with a second "surface-lubricating" film of very similar fluorocarbon structure. [Examples include poly (perfluoroethylene oxide) or poly (perfluoropropylene oxide)]. The surface lube may be applied by dipping, or spraying, from a dilute solution as appropriate. The thickness usually preferred for the surface-lubricating film is the order of 40-60 A°, although both thinner and thicker films are often feasible.

EXAMPLE XI

As X on Carbon Overcoat:

Similarly to the process afore-described, the "R-lube$_m$" reactive lubricant can be attached to a carbon-overcoated metal (recording disc) surface. Again, completion of the process requires the application of a "surface-lube" layer of polyfluorether type. A disadvantage of this modification, however, is the additional processing and cost associated with sputtered carbon coating and with the spacing-loss (magnetic read-out degradation) associated with the carbon thickness.

The results with the invention have, surprisingly, involved no significant down-side, or trade-off. For instance, good stop/start characteristics, low particle count (little "debris"), good friction/stiction performance (no loss in durability)—as compared with a "single-lubricant" system.

It will be understood that the preferred embodiments described herein are only exemplary, and that the invention is capable of many modifications and variations in construction, arrangement, and use without departing from the spirit of the invention.

Further modifications of the invention are also possible. For example, the means and methods disclosed herein are also applicable for other like (in-contact, computer) recording media. Also, the present invention is applicable for providing a lubricant system in other analogous situations (such as for other "in-contact" media).

The above examples of possible variations of the present invention are merely illustrative. Accordingly, the present invention is to be considered as including all possible modifications and variations coming within the scope of the invention as defined by the appended claims.

What is claimed is:

1. A method of over-coating a carbon coated metallic magnetic recording medium surface with fluoro-polymer lubricant said recording surface being characterized by active hydroxyls, this method involving selecting reactive fluoro-polymer lubricant material having reactive terminations at both ends of a backbone;

applying the reactive fluoropolymer lubricant material to said recording surface and allowing it to react there so as to create a relatively thin, continuous uniform reacted-film characterized by the bonding of each termination to an active hydroxyl in or on this recording surface; then stripping-away excess, unreacted reactive fluoropolymer lubricant material whereby to provide superior resistance to lubricant spin-off and to like depletion phenomena.

2. The method of claim 1 wherein said carbon is deposited on said metallic magnetic recording surface such as to leave pores and/or microdepressions in the carbon film.

3. The method of claim 1 where said carbon is sputter-deposited.

4. The method of claim 3 wherein the carbon coated metallic magnetic recording surface is characterized by moisture; and wherein the reacted film thickness is the order of a monomolecular layer.

5. The method of claim 4 wherein the reactive lubricant material is di-isocyanate-terminated and reacts to create a urethane bond on each end.

6. The method of claim 1 wherein said metallic magnetic recording surface is sputtered Co-Ni.

7. The method of claim 1 wherein the carbon coated metallic magnetic recording recording surface is pretreated sufficient to enhance surface reactivity.

8. The method of claim 1 wherein the metallic magnetic recording surface is a sputtered magnetic metal and the carbon overcoat is further sputtered on the sputtered magnetic metal.

9. The method of claim 8 wherein the sputtered metallic magnetic recording surface is aged, in air, for at least a few hours before application of said reactive fluoropolymer lubricant material.

10. A magnetic recording medium made by the process of claim 1.

11. The method of claim 1 wherein said reactive fluoropolymer lubricant material is a short-chain fluoroalkyl polymer, having characteristics of a surface lubricant.

12. The method of claim 11 wherein the reacted film is, in turn, coated with a liquid fluoropolymer surface lubricant selected to be structurally the same as, or similar to, the backbone of the reactive-fluoropolymer lubricant material, and applying this surface lubricant on the bonded film so that it is attracted to the exposed backbone of the reactive fluoropolymer material, the said bonding of the reactive fluoropolymer material, together with affinity of the surface lubricant to said backbone, serving to provide superior resistance to lubricant spin-off and like depletion phenomena.

13. The method of claim 12 wherein said reactive fluoropolymer lubricant material is a per-fluoro polyether which is di-isocyanate terminated.

14. The method of claim 1 wherein said metallic magnetic recording surface is sputtered Co-Ni.

15. The method of claim 14 wherein said reactive fluoropolymer lubricant material is a per-fluoro polyether which is di-isocyanate terminated.

16. The method of claim 15 wherein the lubricant material is selected to have a molecular weight of less than about 10,000, to emphasize its short-chain lubricant qualities.

17. A magnetic recording medium made by the process of claim 14.

18. The method of claim 11 where the reacted-film is, in turn, coated with a liquid fluoro-polymer surface lubricant, this surface lubricant being selected to be structurally the same as, or similar to, the backbone of the reactive fluoropolymer lubricant material, and applying this surface lubricant on the bonded reactive fluoropolymer lubricant material so that it can be attracted to the exposed backbone thereof, the said bonding of the reactive fluoropolymer lubricant material, together with affinity of the surface lubricant to said backbone, serving to provide superior resistance to lubricant spin-off and like depletion phenomena.

19. The method of claim 18 wherein said carbon is sputter-deposited.

20. The method of claim 19 wherein the carbon coated metallic magnetic recording surface is characterized by moisture; and wherein the reacted-film is the order of a monomolecular-layer thick.

21. The method of claim 20 wherein the reactive fluoropolymer lubricant material is di-isocyanate terminated and reacts to create a pair of urethane bonds.

22. A magnetic recording medium made by the process of claim 18.

23. A method of reducing depletion of a liquid fluorocarbon surface-lubricant applied on carbon coated metallic recording surface areas of a high speed metallic data recording medium, this method characterized by contacting the recording surface areas with at least one layer of a polymeric lubricant compound having isocyanate-terminations or acidic-terminations or epoxy terminations at both ends, and then reacting this compound on said areas to form an array of chemical bonds with the recording surface, with at least some of this compound being left as a continuous protective film, the compound being selected so that the backbone portion thereof, between said terminations, is sufficiently like the structure of the surface lubricant as to induce adhesion therebetween.

24. A method of reducing depletion of liquid lubricant applied on porous metallic recording surface portions of a high speed data recording medium, this method characterized by pre-treating the surface portions to enhance reactivity; then contacting the surface portions with several layers of a di-isocyanate-terminated polymeric lubricant material and reacting this material there so as to form an array of chemical bonds with the recording surface portions, then removing unreacted material so that a residue is left as a continuous protective film, the backbone of the polymeric material being selected to exhibit lubricant characteristics and adapted for attraction to said liquid surface lubricant whose structure is sufficiently similar to induce adhesion therebetween;

and wherein the residue material is then coated with a thin film of such liquid surface lubricant of such structure whereby to induce mutual attraction thereof and so inhibit removal of the surface lubricant.

25. A method of enhancing retention and lubricity of a polymeric surface-lubricant applied on porous disk recording surface areas of a high speed metallic data recording disk medium, this method characterized by contacting said recording surface areas with a polymeric lubricant material, portions of this material being adhered continuously across said areas and left as a continuous protective film; and then removing all excess lubricant material; then contacting the so-formed film with liquid surface lubricant, to yield a lubricant-on-lubricant structure.

* * * * *